Oct. 6, 1970

B. L. GELFAND ETAL

3,531,928

ALARM CLOCK TIMER

Filed May 6, 1968

INVENTORS
BENJAMIN L. GELFAND,
JAMES W. RICHMOND,
ELEANOR ABBOTT BAST AND
JAMES E. MORTON
by George R. Clark
ATTORNEY Oct. 6, 1970    B. L. GELFAND ETAL    3,531,928
ALARM CLOCK TIMER
Filed May 6, 1968    8 Sheets-Sheet 3

INVENTORS
BENJAMIN L. GELFAND,
JAMES W. RICHMOND,
ELEANOR ABBOTT BAST AND
JAMES E. MORTON
by George R. Clark
ATTORNEY.

Oct. 6, 1970 B. L. GELFAND ETAL 3,531,928
ALARM CLOCK TIMER
Filed May 6, 1968 8 Sheets-Sheet 4

INVENTORS
BENJAMIN L. GELFAND,
JAMES W. RICHMOND,
ELEANOR ABBOTT BAST AND
JAMES E. MORTON
by George R. Clark
ATTORNEY.

Oct. 6, 1970     B. L. GELFAND ETAL     3,531,928
ALARM CLOCK TIMER
Filed May 6, 1968     8 Sheets-Sheet 5

INVENTORS
BENJAMIN L. GELFAND,
JAMES W. RICHMOND,
ELEANOR ABBOTT BAST AND
JAMES E. MORTON
by George R. Clark
ATTORNEY.

United States Patent Office 3,531,928
Patented Oct. 6, 1970

3,531,928
ALARM CLOCK TIMER
Benjamin L. Gelfand, Chicago, James W. Richmond, Bensenville, Eleanor Abbott Bast, West Chicago, and James E. Morton, Lombard, Ill., assignors to Sunbeam Corporation, Chicago, Ill., a corporation of Illinois
Filed May 6, 1968, Ser. No. 726,858
Int. Cl. G04b 13/00; G04c 21/16
U.S. Cl. 58—19                                                23 Claims

ABSTRACT OF THE DISCLOSURE

An alarm clock timer, including a selector control movable between an ON, OFF, AUTOMATIC and ALARM position for controlling the timed operation of an electrical appliance, such as a radio and the alarm signaling means of the clock. An adjustable time delay selector is provided to permit the appliance to be turned on for a selected time period and then shut off automatically, and a resettable alarm delay mechanism is provided for disabling the alarm for selected time intervals after an initial signal actuation.

The present invention relates to a new and improved alarm clock timer for controlling an electrical appliance, such as a radio or television set, and more particularly to a new and improved timing control device adapted for use with an alarm clock, such as that shown and described in U.S. Pat. No. 3,248,867 of Jepson et al., granted May 3, 1966, and assigned to the same assignee as the instant application.

The electric clock motor and movement of the aforementioned Jepson et al. patent was a great step forward in providing a low cost, mass producible, operationally reliable alarm clock and utilizes a low speed, synchronous motor wherein the poles of the motor comprise a plurality of fingers integrally formed from the plates making up the framework for supporting the clock movement. A vibrating reed-type alarm buzzer is incorporated in the alarm clock of the aforesaid Jepson et al. patent, and the reed includes a free end which vibrates back and forth against a portion of one of the mounting plates of the clock frame in accordance with the fluctuating magnetic field produced therein, thereby producing an audible alarm signal.

The timing device of the present invention is suitable for combination with the Jepson et al. type clock motor and movement and is also useful in application with other types of clock motors and movements heretofore known. In a preferred adaptation, the timing device of the present invention is assembled onto a clock motor and movement of the type shown in the aforesaid patent and requires only minor modifications therein. The resulting combination is an improved alarm clock timer having a variety of operational features; for example, the improved alarm clock timer of the present invention is capable of performing selectively any of the desired following operations:

(1) Turning a radio, or other appliance, on or off manually, as desired;
(2) Turning a radio, or other appliance, on automatically at a preselected future time without actuating an alarm signal;
(3) Turning a radio, or other appliance, off automatically after an adjustable, predetermined lapse of time, so that a user may go to sleep while listening to the radio, which will later be turned off automatically at the end of a preselected time period;
(4) Turning a radio on automatically at a preselected future time and subsequently causing an alarm signal to sound after a delay period. In this connection the alarm buzzer may be disabled for successive, fixed periods of time by manually resetting an alarm delay mechanism.

One of the problems associated with prior art devices capable of performing the function outlined above, is the extreme complexity, intricate nature, and resulting high cost of the mechanism. It is desirable to provide a mechanism which is reduced significantly in complexity and greatly simplified, thereby providing improved operating results and reliability in operation.

It is therefore an object of the present invention to provide a new and improved alarm clock timer.

It is another object of the present invention to provide a new and improved timing control device for use in combination with a clock motor and movement for controlling the alarm buzzer therein and for controlling a separate appliance, such as a radio or television set.

Another object of the present invention is the provision of a new and improved alarm clock timer wherein a radio or television set may be controlled thereby and may be turned on or off manually.

Another object of the present invention is the provision of a new and improved alarm clock timer wherein a radio or television set may be turned on manually and then is automatically turned off after an adjustably selected predetermined period of time.

Still another object of the present invention resides in the provision of a new and improved alarm clock timing device which is operable to turn a radio or other appliance on automatically at a preselected future time.

Yet another object of the present invention is the provision of a new and improved alarm clock timer operable to turn a radio or other appliance on automatically at a preselected future time, and thereafter, upon the lapse of a short time interval, sound an alarm buzzer.

Yet another object of the present invention is the provision of a new and improved alarm clock timing device as described in the aforementioned paragraphs, provided with means for manually resetting the alarm buzzer so that the buzzer is disabled for a period of time but will again be activated at the end of the period, all the while the radio or other appliance being on.

It is another object of the present invention to provide a new and improved alarm clock timer which is simple in construction and operation, low in cost, and which is easily assembled on and usable to control prior types of clock motors and movements such as that shown in the aforesaid Jepson et al. patent.

Further objects and advantages of the present invention will become apparent as the following description proceeds, and the features of novelty which characterize the invention will be pointed out with particularity in the claims annexed to and forming a part of this specification.

Briefly, the foregoing and other objects and advantages of the present invention are accomplished in one illustrative embodiment of the present invention, which includes a new and improved alarm clock timer having a frame and a clock movement supported thereon. The clock includes a vibrating alarm member which is controlled by an alarm lever operatively connected with the movement and operable to unblock or release the alarm member for vibration against the frame at a set or selected time. A four-position selector switch is provided for controlling the operational function of the alarm buzzer and a separate switch for controlling an electrical appliance, such as a radio, television set, or other device and is movable between an ON, OFF, ALARM, and AUTOMATIC (designated AUTO) position. When in an ON position, the radio or other appliance is turned on, and when in an OFF position, the appliance is shut off. When in an ALARM position, at a selected time the appliance will automatically turn on and shortly thereafter the alarm buzzer will sound. In the AUTO position, the appliance will come on automatically at the selected time and no alarm will be sounded.

The alarm clock timer also includes an adjustable interval selector or sleep switch which is operable to maintain the appliance energized until a predetermined time interval, as set by an adjustable interval selector, has elapsed, at which time the appliance will be turned off automatically. The alarm clock also includes a manually resettable alarm delay which is operable to silence the alarm buzzer when it is actuated with the main selector in the ALARM position. Manual resetting of the alarm delay silences the alarm for a predetermined short interval of time. When this interval has expired, the alarm will again sound.

For a better understanding of the present invention, reference should be had to the following detailed description and appended claims, taken in conjunction with the accompanying drawings, in which:

Figure 1:
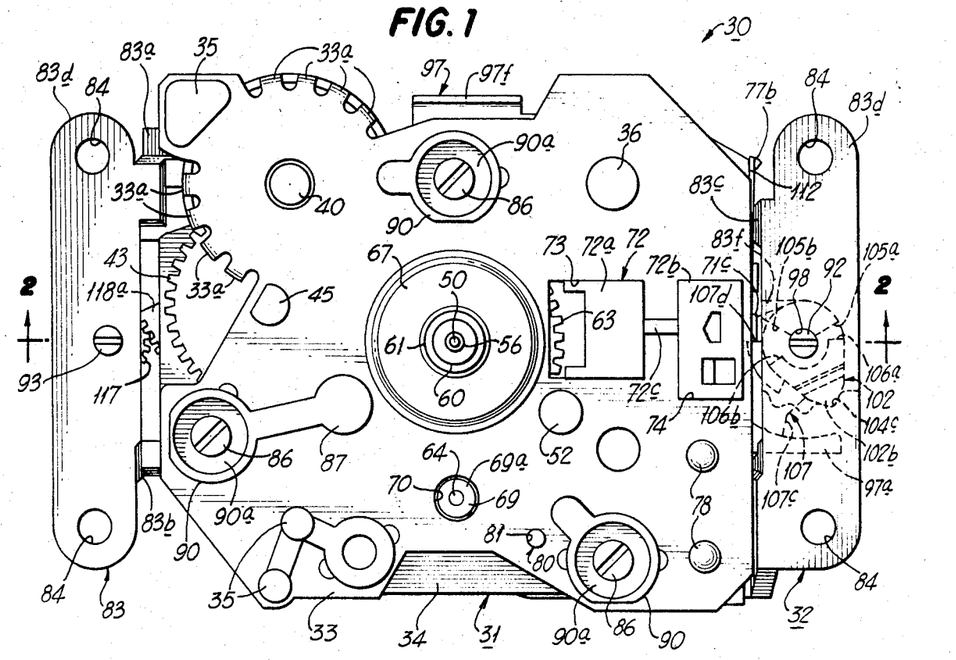
FIG. 1 is a front elevational view of a new and improved alarm clock timer constructed in accordance with the features of the present invention.
Figure 2:
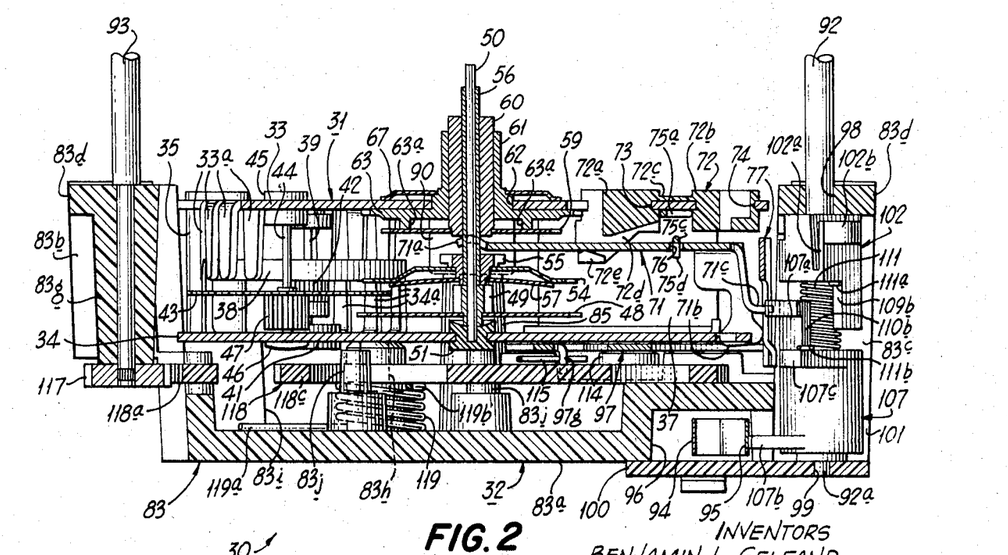
FIG. 2 is a transverse cross-sectional view of the alarm clock timer of FIG. 1, taken substantially along line 2—2 of FIG. 1.
Figure 3:
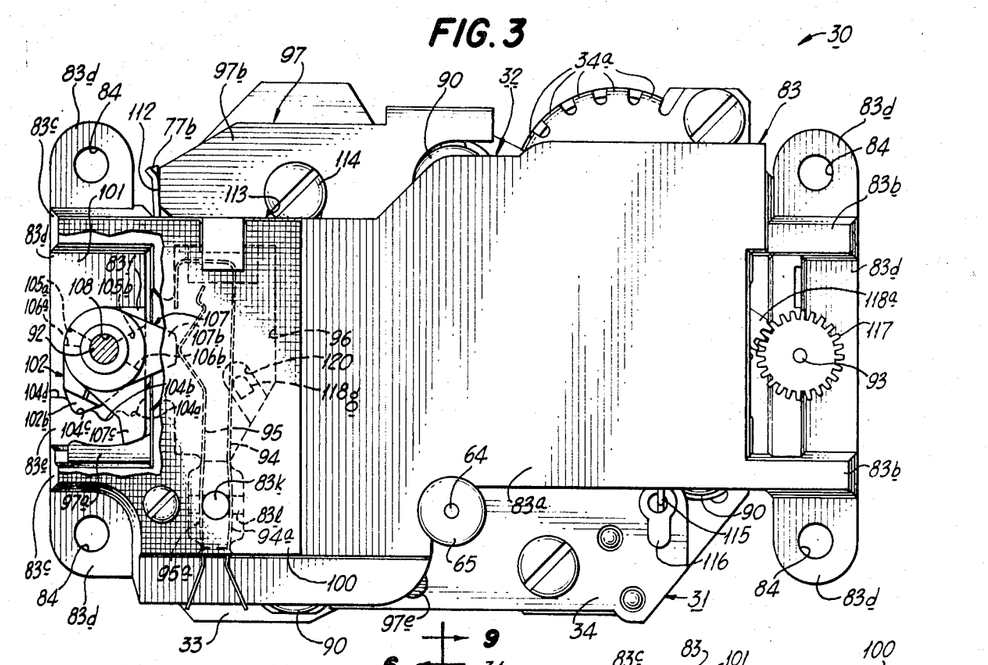
FIG. 3 is a rear elevational view of the alarm clock timer.

Referring now to the drawings, and particularly to FIGS. 1, 2, and 3, there is illustrated a new and improved alarm clock timer 30 constructed in accordance with the features of the present invention. The alarm clock timer 30 includes a clock motor and movement 31 preferably of the type described in the aforementioned Jepson et al. patent with a few modifications therein, as will be described hereinafter, and a timer control mechanism generally indicated as 32 mounted thereon. For a more complete description of the construction and operation of the clock and movement 31, reference should be had to the aforementioned Jepson et al. patent; however, the essential portions of the mechanism and the operating functions thereof as are necessary for an understanding of the present invention will be described briefly herein.

The clock 31 includes a framework having a pair of parallel, spaced apart, front and back plates 33 and 34 constructed of magnetic material and maintained in spaced apart relation by a plurality of transverse spacers 35 (FIGS. 1 and 11) which are constructed of nonmagnetic material, such as plastic or nylon, and by various shafts and other components of the motor and movement mounted between the plates.

Figure 6:
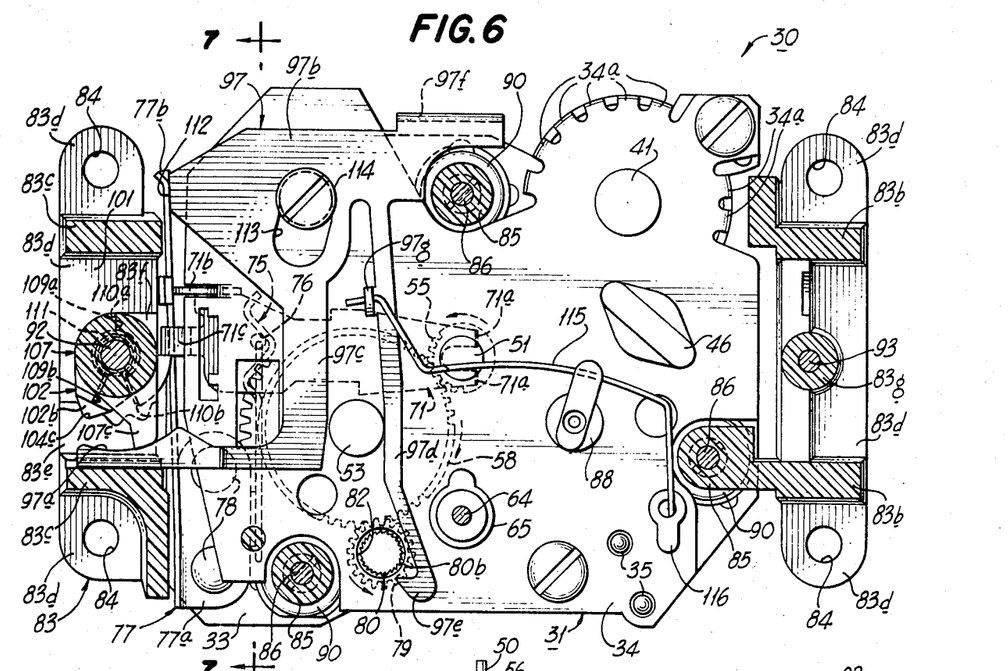
FIG. 6 is a longitudinal sectional view taken substantially along line 6—6 of FIG. 4.

The front and back plates 33 and 34 are cut or stamped to shape as shown in FIGS. 1 and 6, and each is provided with a plurality of spaced fingers, bent inwardly at substantially right angles toward the opposite plate to form a plurality of pairs of alternate, spaced apart, magnetic field poles 33a and 34a for driving the clock rotor at a relatively low speed of about 200 r.p.m. When the frame plates 33 and 34 are magnetized by the field produced from 60-cycle AC current, the rotor of the clock motor is driven synchronously at a constant rate. In order to magnetize the frame plates 33 and 34, a core of ferrous material 36 is mounted to extend transversely between the frame plates, and a spool-type motor field coil 37 is mounted on the core. When the field coil 37 is energized by 60-cycle alternating current, the frame plates are magnetized with alternating polarity at the rate of 60 cycles per second, and each pair of magnetic poles 33a and 34a supplies magnetomotive force to drive a permanently magnetized rotor disc 38 which is disposed for rotation within the cagelike structure formed by the circularly arranged pairs of alternate poles 33a and 34a. The rotor disc is mounted on a rotor shaft 39 extended between the frame plates and journaled at opposite ends in plastic bearings 40 and 41 secured to respective front and back plates (FIGS. 1, 2, and 6).

Referring briefly to FIG. 2, a small pinion 42 is mounted on the rotor shaft 39 for direct driving engagement with a larger gear 43 mounted on an idler shaft 44 extending between the front and back plates and supported in plastic bearings 45 and 46 secured to the respective frame plates.

As described in the aforementioned Jepson et al. patent, the gear 43 is restricted against rotation in one direction so that the hands of the clock will always be driven in the proper, clockwise direction. The mechanism for accomplishing this is not shown in the present application. Because the gear 43 is relatively large in diameter compared to the rotor pinion 42, the shaft 44 rotates at a much slower speed than the main rotor shaft 39.

A first reduction pinion 47 (FIG. 2) is mounted on the shaft 44 for driving engagement with a first reduction gear mounted on a first reduction shaft (not shown) extended transversely between the front and back plates and spaced parallel with the shaft 44. The first reduction shaft is supported on plastic bearings 87 and 88 (FIGS. 1 and 6) secured to the front and back plates and a second reduction pinion is mounted thereon for driving engagement with a second reduction gear 48 (FIG. 2) mounted on a rearwardly extended spindle portion of a pinion sleeve 49. The pinion sleeve 49 is supported on and drives a second shaft 50 having its rearward end journaled in a grommet bearing 51 (FIG. 6) on the back plate 34. The forward end portion of the shaft 50 projects forwardly through the front plate 33 and outwardly, and a sweep second hand (not shown) may be mounted on the outer end of the shaft. The gear train, as described, between the rotor shaft 39 (which rotates at approximately 200 r.p.m.) and the second shaft 50, is effective to provide the desired gear reduction ratio, so a sweep second hand, mounted on the second shaft, will rotate at 1 r.p.m. and also indicate to the viewer that the clock motor is operating.

The pinion 49 on the second shaft 50 is drivingly engaged with a minute reduction gear not shown, which is mounted for free rotation on a shaft not shown, spaced radially outwardly of the second shaft and supported at opposite ends in plastic bearing members 52 and 53 (FIGS. 1 and 6) secured to the respective front and back plates 33 and 34. The minute reduction gear which is substantially larger than the pinion 49 and is thus driven at a much slower speed than the 1 r.p.m. speed of the second shaft. The minute reduction gear is staked onto a pinion (not shown) which is in driving engagement with a relatively larger minute gear 54 (FIG. 2) mounted in coaxial relation with the second shaft 50. The gear 54 is seated on an intermediate shouldered portion of a pinion 55 (FIGS. 2 and 6), which is secured to the inner end of a hollow minute sleeve 56 journaled for coxial relative rotation on the second shaft 50. The minute sleeve 56 projects outwardly through the front plate 33 and a minute hand (not shown) is attached onto the outer end thereof rearwardly of the sweep second hand to indicate the minute time on the face of the clock (not shown).

In order to permit slippage or relative rotation between the coaxially mounted gear 54 and pinion 55 when the minute and hour hands of the clock are being set while the rotor is running, a spiderlike spring clutch 57 is mounted on a rearward shoulder or sleeve portion of the pinion 55 and the spider continuously biases the gear 54 forwardly against the forward face of the intermediate shoulder so that during normal clock operation the gear and pinion 55 rotate together at the same speed, making one complete revolution each hour. The pinion 55 is drivingly engaged with a larger hour hand, reduction gear 58 (FIG. 6) journaled for free rotation on the shaft supported in the bearing members 52 and 53. The gear 58 is staked onto the rearward end portion of an elongated pinion sleeve (not shown) which is in driving engagement with an hour gear 59 (FIG. 2) mounted on the rearward end of a tubular hour sleeve 60. The hour sleeve is mounted for coaxial relative rotation on the minute sleeve 56 and also projects forwardly through the front plate so that an hour hand (not shown) may be mounted on the outer end of the sleeve 60 rearwardly of the minute hand. The hour sleeve rotates one complete revolution every twelve hours, and is slidable axially on the minute sleeve 56 between an inward position (FIG. 1) and an outward position (FIG. 8), as will be described hereinafter.

The hour sleeve 60 is supported for rotation within the hollow, axial bore of a tubular set sleeve 61 which extends forwardly through and is supported in a circular opening 62 formed in the front plate 33 in coaxial alignment with the second shaft 50. A set gear 63 is integrally formed at the inner end of the set sleeve 62 and is selectively rotatable against the inside face of the front plate 33. As more fully described in the previously mentioned Jepson et al. patent, the set gear 63 is formed with a pair of rearwardly extending lugs 63a spaced radially outwardly of the axis of rotation of the set sleeve 61 and the lugs 63a are adapted to engage the forward face of the hour gear 59 which rotates relative thereto during clock operation. A time set hand is mounted on the outer end of the set sleeve 61 to indicate the time at which the alarm is set, and the set gear and hand are rotatable to any desired setting on the clock face by a manual set shaft 64 (FIGS. 1, 3, 4, and 6) which is mounted for axial sliding movement in a plastic bearing grommet 65 (FIG. 3) mounted in an opening on the rear plate 34 of the clock frame. The set shaft 64 projects rearwardly outwardly through the rear plate 34 and a set knob 66 is mounted on the outer end to facilitate turning of the shaft by the user. When it is desired to set or change the setting of the set indicating hand on the clock face and, accordingly, change the time at which the alarm or radio will be automatically turned on, the set shaft is shifted axially forward in the grommet 65 until a gear 69 mounted on the forward end of the shaft is moved into meshing engagement with the set gear 63. Rotation of the set knob 66 then causes the set gear 63 to rotate and the relative rotative position of the lugs 63a with respect to the hour gear 59 is changed accordingly. The set gear 63 is biased forwardly against the front plate 33 of the clock frame to prevent rotation thereof, except when the setting is adjusted manually as described, by means of an annular spring washer 67 (FIG. 2) having an outer periphery bearing against the outer surface of the front plate 33, and the inner periphery of the spring is seated on a shoulder portion formed on the set sleeve 61. The spring washer 67 prevents rearward movement of the set sleeve in the opening 62 in the front plate but permits rotation of the set gear 63 by the set shaft 64 to any desired position and maintains the gear in the selected position against the front plate when the set shaft is released. The hour sleeve 60 is biased forwardly in the bore of the set sleeve 61 so that the hour gear 59 is in maintained continuous engagement with the lugs 63a on the set gear, but the rotative force exerted by the hour gear is not effective to rotate the set gear from its selected position, once set.

Figure 8:
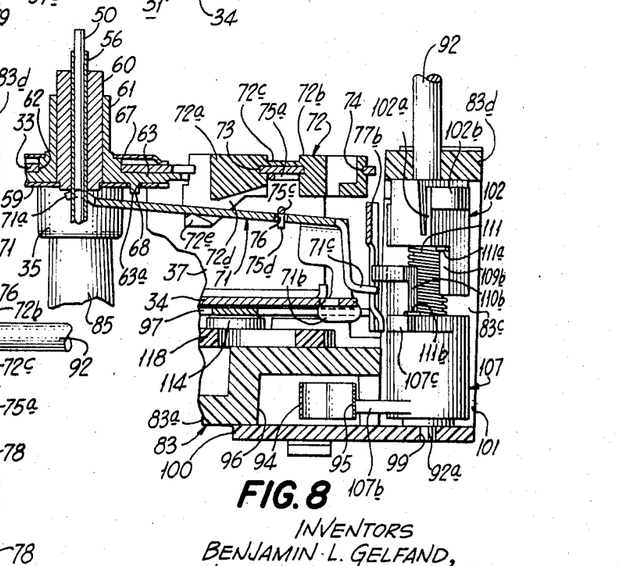
FIG. 8 is a fragmentary, cross-sectional view of a portion of the timer at the right-hand side of FIG. 2 illustrating the alarm lever in its alarm ON position.

Referring to FIG. 8, the hour gear is provided with a pair of slots 68 disposed thereon and radially outward of the axis of rotation. The slots are appropriately sized and spaced in order to receive the lugs 63a of the set gear 63 when the gears 63 and 59 are in a selected position of angular displacement during each revolution of the gear 59 relative to the set gear. The set gear, after a selected setting is made, does not rotate, and the hour gear 59 rotates continuously relative thereto. When the slots 68 rotate to a position directly opposite the lugs 63a the hour gear is then free to slide axially forward against the rear face of the set gear and the lugs 63a project rearwardly through the slots 68, as shown in FIG. 8.

Each lug 63a on the set gear 63 is formed with an edge face normal to the plane of the gear body and a rearwardly facing surface sloping from the edge face forwardly toward the gear body. After the lugs 63a are seated in the slots 68 when the hour gear 59 has moved axially forwardly against the set gear 63, as previously described (FIG. 8) continued rotation of the hour gear 59 relative to the set gear results in the hour gear gradually moving axially rearwardly to the spaced apart rearward position (FIG. 2) because of the engagement of the edges of the slots 68 with the sloping rearward surfaces on the lugs 63a. This process is completed in about forty minutes after the hour gear initially moves forward against the set gear to initiate movement of the alarm lever, and the exact time interval for the hour gear to return to its fully rearward position is determined by the slope of the rearward cam surfaces on the lugs. Because of this, once an alarm signal commences it will continue for a considerable time period before it is silenced automatically unless other control measures are taken by the user.

On the other hand, because of the normal edge faces of the lugs 63a, the hour gear 59 will move rapidly forward to the full forward position only after precise alignment between the lugs and the slots 68 is obtained, and thus the alarm lever will move from an alarm OFF or blocking position to an alarm ON position almost instantaneously at the time for which the alarm is set. Moreover, once the lugs 63a are fully engaged in the slots 68, it is impossible to rotate either the set gear or the hour gear in the wrong direction relative to one another (i.e., a direction opposite to that of normal rotation) and, hence, it is impossible for a user to reset the alarm for a later time after the alarm lever has moved, unless the set hand is rotated almost a complete revolution in the counterclockwise direction on the clock face.

In order to set the hour and minute hands of the clock to the proper time, the set shaft 64 and knob 66 are retracted rearwardly until the setting gear 69 on the forward end of the shaft is brought into engagement with the gear which drivingly engages the pinion 55 on the inner end of the minute seleve. Because of the spider clutch 57, the gear 54 mounted on the pinion 55 can remain stationary while the pinion is rotated to set the minute hand and hour hand of the clock through the drive train between the pinion 55 and the hour sleeve 60. This feature is more completely described in the aforementioned Jepson et al. patent, and has the advantage of requiring only a single knob setting gear and shaft for setting both the alarm and the time.

In order to support the forward end of the set shaft 64 when the setting gear thereon is in the forward or alarm setting position engaging the set gear 63, the setting gear 69 is formed with a forwardly projecting annular shoulder 69a (FIG. 1) which is adapted to seat in a circular opening 70 provided in the front plate 33 of the clockframe. Thus the set shaft is supported at the front and rear when setting the alarm, and when retracted rearwardly for setting the hands of the clock, the bushing 65 on the rear frame plate 34 provides ample support.

In order to bias the hour sleeve 60 forwardly on the minute sleeve 56 so that the hour gear 59 will move forwardly into engagement against the set gear 63 when the lugs 63a are precisely aligned with the slots 68 in the hour gear, a pair of spaced apart fingers 71a formed on the inner end portion of an alarm lever 71 are disposed to ride on opposite sides of the minute sleeve 56 and bear forwardly upon the rearward end face of the hour sleeve 60. The alarm lever 71 is supported for pivotal movement relative to the front plate 33 of the clock frame on a plastic mounting block 72 (FIGS. 1 and 8) which is secured into a pair of spaced apart, rectangular openings 73 and 74 formed in the front plate 33. As best shown in FIG. 1, the mounting block 72 is integrally molded in place within the openings 73, 74 and includes a pair of spaced apart, blocklike portions 72a and 72b joined by a leg 72c, as shown in FIG. 1. The block portion 72a includes a pair of opposite side flanges 72d projecting rearwardly from the front plate 33 towards the back plate 34 and a pair of projections or lugs 72e are formed on the inside facing surfaces of the flanges to bear against and pivotally support the alarm lever 71 intermediate its ends, as best shown in FIGS. 2 and 8. The fingers 71a of the alarm lever are biased forwardly toward the front plate 33 against the rearward end of the hour sleeve by means of a hairpinlike biasing spring 75 having an elongated leg 75a (FIG. 18) with a zigzag portion at the outer end, which zigzag portion is seated against the front plate between the rearwardly projecting spaced apart block portions 72a and 72b of the mounting block 72, as best shown in FIGS. 1 and 8.

Figure 18:
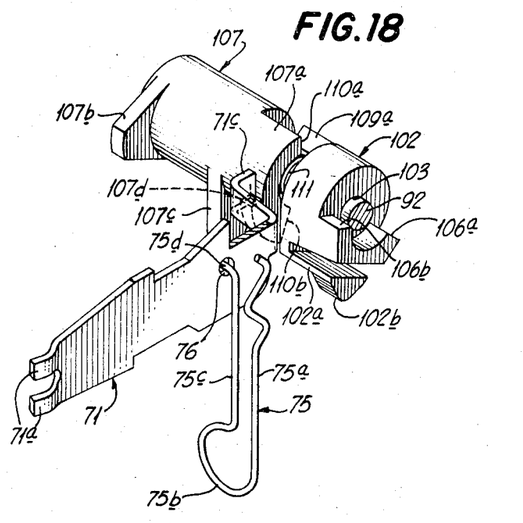
FIG. 18 is a perspective view of the main selector, the alarm lever and its biasing spring in one of the cooperating functional relationships.
Figure 19:
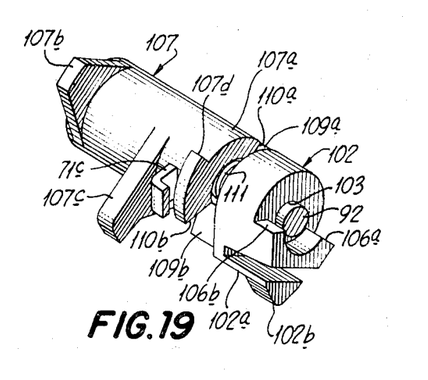
FIG. 19 is a perspective view of only a portion of the mechanism shown in FIG. 18.
Figure 20:
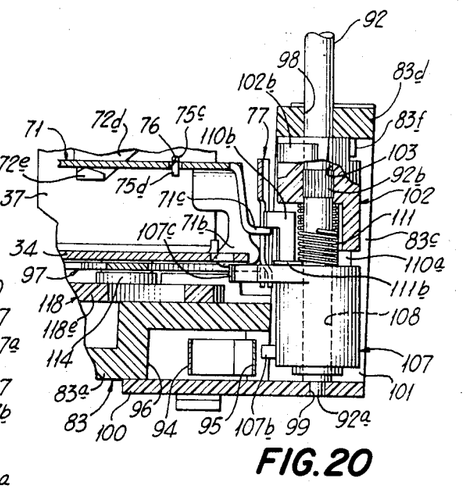
FIG. 20 is a fragmentary cross-sectional view similar to FIG. 8 but illustrating the alarm lever in an alarm blocking position.

Referring to FIG. 18, the spring 75 includes a loop portion 75b at the inner end of the leg 75a and an opposite leg portion 75c extended outwardly from the loop having a hook portion 75d at its outer end which projects into a hole or opening 76 formed in the alarm lever 71 outwardly of the pivotal point adjacent the lugs 72e on the mounting block. The spring 75 is initially stressed so that the legs 75a and 75c normally tend to move away from one another at their outer ends and, accordingly, the outer end of the leg 75c and the hook portion 75d tend to bias the outer end portion of the alarm lever 71 outboard of the lugs 72e toward the rear plate 34. The inner end portion of the lever and the fingers 71a are thus biased forwardly against the hour sleeve 60 urging the hour gear 59 forwardly to seat against the set gear 63 when the lugs 63a and slots 68 are properly aligned for initiation of the alarm signal.

Figure 7:
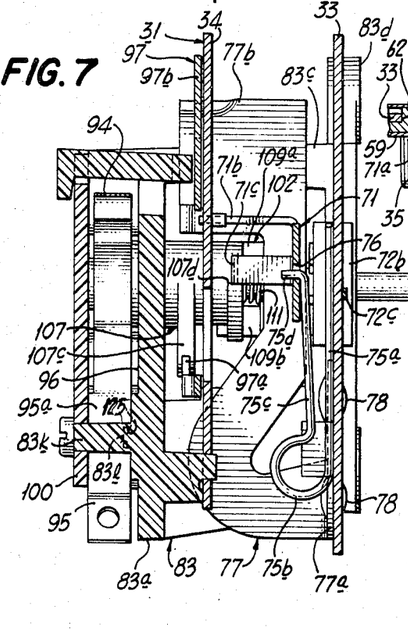
FIG. 7 is a cross-sectional view taken substantially along line 7—7 of FIG. 6, assuming that the latter shows the entire structure.

The alarm lever 71 is pivotally supported on the lugs 72e of the mounting block 72 for rocking movement between an alarm blocking and an alarm ON position (FIG. 8) or OFF position (FIG. 2). All of the time that the hour gear 59 and set gear 63 are maintained in spaced apart relation because the lugs 63a are not aligned with the slots 68, the alarm lever is held in the alarm OFF position and when the lugs and slots become aligned and the hour gear 59 moves forwardly against the set gear 63, the alarm lever moves to the alarm ON position. When this occurs, the outer end portion of the alarm lever outboard of the pivot lugs 72e is moved rearwardly of the front plate 33 by the alarm biasing spring 75. The outboard end of the alarm lever is provided with a transverse leg portion 71b having a rounded, enlarged outer end (FIGS. 2 and 8) which is adapted to move into and out of engagement with the outer or free end of a vibrating alarm member or reed 77. As best shown in FIGS. 6 and 7, the alarm member 77 includes a fixed end support flange or bracket 77a which is attached by rivets 78 to the front plate 33 of the clock frame and the main body portion of the alarm member extends on a plane generally normal to the plates 33 and 34 and is positioned to lie adjacent and outward of the left-hand edges of the plates as viewed in FIG. 6. Referring specifically to FIG. 6, because the fixed end 77a of the alarm reed 77 is in direct contact with the front plate 33 of the clock frame, the alarm reed is magnetized in accordance with the magnetic polarity of the front plate. The rear plate 34 has an opposite magnetic polarity, and the outer or free end 77b of the reed (FIGS. 6 and 7) is alternately attracted and repelled from the adjacent edge surface of the back plate 34 as the polarity alternates, thereby producing an audible alarm signal or buzzing sound as it vibrates toward and away from the adjacent side edge surface of the back plate. While the alarm lever 71 is maintained in the alarm OFF or blocking position, as shown in FIG. 2, the enlarged outer end of leg portion 71b of the lever 71 stresses and holds the outer or free end 77b of the alarm reed outwardly away from the edge of the back plate 34 of the frame and prevents vibration thereof. When the alarm lever 71 moves into the alarm ON position, as shown in FIG. 8, the outer end of portion 71b of the alarm lever moves inwardly away from the outer end portion 77b of the alarm reed, allowing the reed to vibrate because of the alternate attraction and repulsion toward and away from the adjacent edge surface of the back plate 34, thereby producing an audible alarm signal or buzzing sound.

From the foregoing description, it is seen that the alarm clock 31 is substantially similar to the clock motor and movement disclosed in the aforementioned Jepson et al. patent, with the exception of the alarm lever 71, which is modified somewhat, and the alarm reed 77, which is somewhat different in construction. Also, the alarm lever biasing arrangement is somewhat different than in the Jepson et al. patent disclosure, and a ratchet shaft has been added, as will be described hereinafter.

Figure 12:
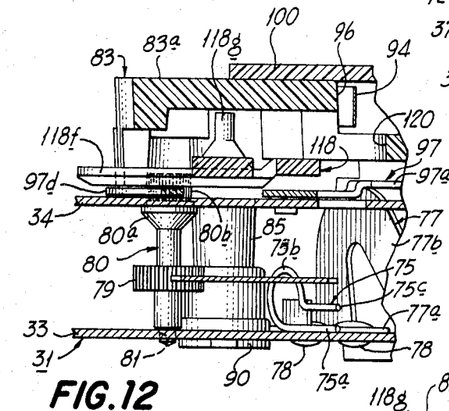
FIG. 12 is a fragmentary cross-sectional view taken substantially along line 12—12 of FIG. 10.
Figure 13:
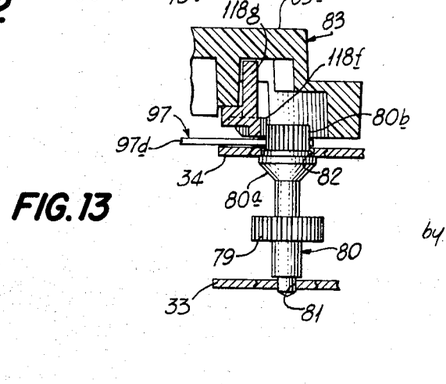
FIG. 13 is a fragmentary cross-sectional view taken substantially along line 13—13 of FIG. 10 assuming that FIG. 10 shows the complete structure.

In accordance with the present invention, the gear 58 (FIG. 6), meshingly engaged with the pinion 55 on the minute sleeve 56, rotates at a speed lower than the minute shaft because the gear is approximately four to five times as large in diameter as the driving pinion. Referring to FIG. 12, the gear 58 is also drivingly engaged with a gear 79 which is mounted on a ratchet shaft 80 extending between the front and back plates 33 and 34 and spaced outwardly from the shaft which supports the gear 58. Preferably, the ratchet shaft 80 and gear 79 are integrally formed out of plastic material, and the gear 79 is approximately the same diameter as pinion 55, so that the ratchet shaft is rotated approximately the same speed as the minute sleeve 56. In other words, the ratchet shaft makes one complete rotation every hour, while the clock motor is energized. The forward end of the ratchet shaft 80 is journaled for rotation on an opening 81 (FIG. 1) provided in the front plate 33, and as best shown in FIGS. 12 and 13, the rearward portion of the ratchet shaft is formed with an enlarged shoulder 80a which is supported for rotation in a circular opening 82 formed in the rear plate 34. The rearward end portion of the ratchet shaft 80 extends rearwardly of the back plate 34 and is provided with an integrally formed, small diameter, toothed ratchet wheel 80b. The wheel 80b is adapted for selective engagement with control members of the timer 32, as will be hereinafter described, and anytime the clock motor is energized, the ratchet shaft 80 rotates in only one direction at a speed equal to the speed of the minute sleeve 56 of the clock movement.

As thus far described, the clock 31 is substantially similar to the clock motor and movement of the Jepson et al. patent, which has come into wide commercial usage, and with the few modifications pointed out herein, a clock motor and movement as shown in the Jepson et al. patent referred to above is adaptable for use with the timer 32 to provide the selective operating characteristics to be described.

Referring now to FIGS. 1, 2 and 3, in accordance with the present invention the timer 32 includes a body member 83 of molded plastic or the like material, and the body is mounted on the rearward side of the clock framework. The body 83 includes a web or back portion 83a, flanked on opposite sides by forwardly extending flange portion 83b and 83c. As best shown in FIGS. 1 and 3, each flange portion is formed with a mounting flange 83d having a front face parallel to the front plate 33 and on a common plane therewith. The upper and lower portions of each mounting flange are formed with an opening 84 to facilitate mounting of the clock timer combination in the bushing or casing of a clock-radio device, not shown.

The web or back portion 83a of the timer body is fixedly secured parallel to and spaced rearwardly of the back plate 34, by means of a plurality of forwardly projecting, hollow mounting pins 85 (FIG. 6), each having a threaded internal bore adapted to receive a cap screw 86 (FIG. 1). Each headed cap screw 86 is extended rearwardly through a central opening in the bottom wall 90a of a cuplike mounting member 90 formed of plastic material and secured into an appropriately positioned hole formed in the front plate 33 of the clock frame.

Figure 24:
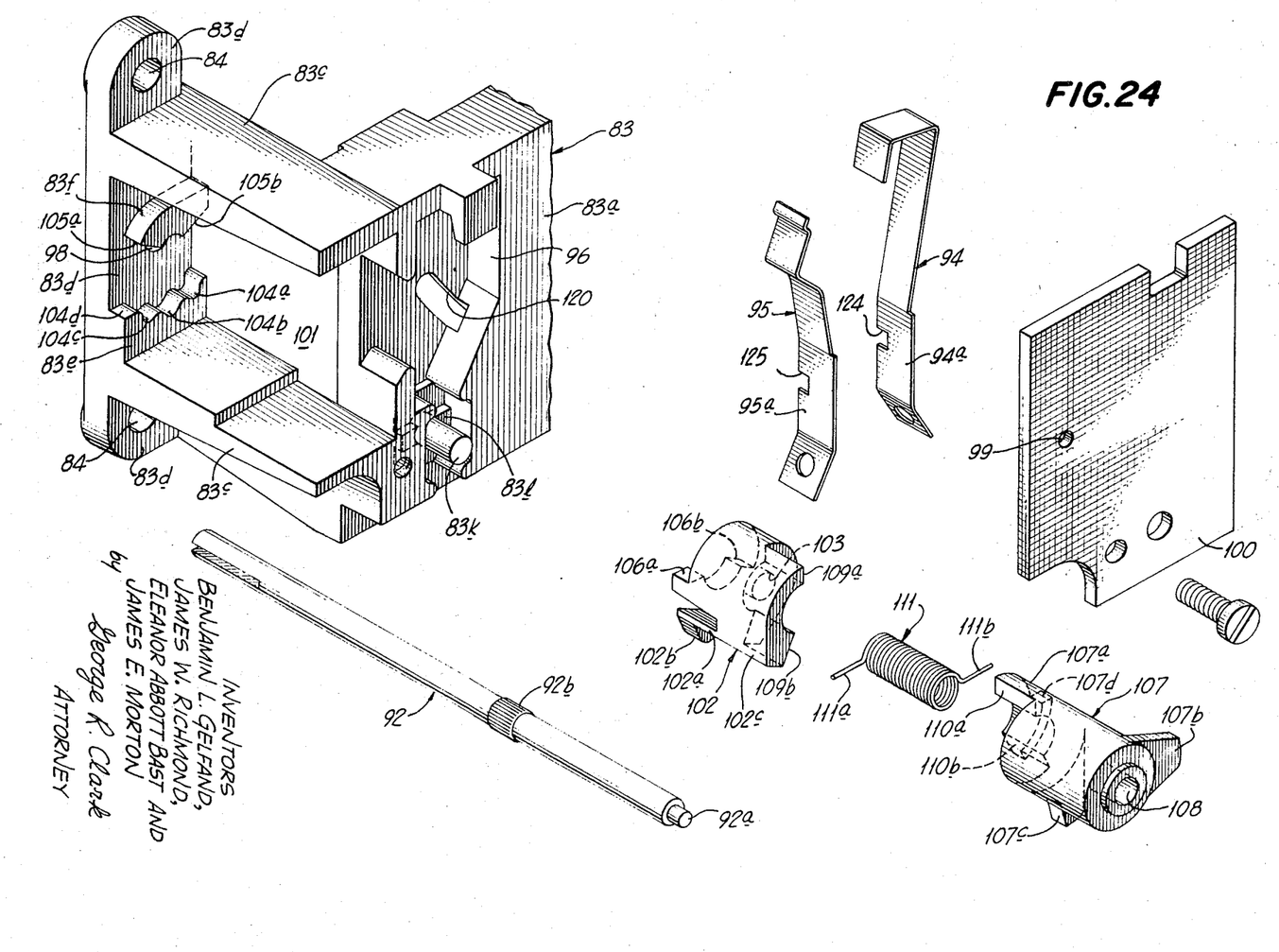
FIG. 24 is an exploded, perspective view illustrating the main selector, detent control and switch mechanism of the alarm clock timer, constructed in accordance with the present invention.

In accordance with the present invention, the timer 32 includes a main function selector shaft 92 which is rotatable between four positions, namely, ON, OFF, AUTO, and ALARM, and an adjustable interval selector shaft 93 or sleep control which is rotatable through approximately 180° to provide for an adjustable time period, at the end of which a radio or other appliance controlled by the timer is automatically shut off. The main function selector shaft is operably interconnected with the outer end of the alarm lever 71 and is also operatively interconnected with an appliance control switch which includes a pair of springlike contact members 94 and 95 mounted in a recess 96 formed in the back or web 83a of the timer body (FIGS. 2, 3 and 24). The timer 32 also includes a manually resettable, alarm delay actuator 97 which is operable to silence the alarm reed 77 after it has commenced to vibrate, and resetting of the actuator silences the alarm for a fixed time interval of approximately eight minutes, at the end of which time interval the alarm will again vibrate to produce the audible alarm signal. The main function selector shaft 92 is operatively interconnected with the alarm delay actuator 97 which is movable between an inward alarm blocking or silencing position (FIG. 17) engaged against the outer end portion 77b of the alarm reed and an outward alarm ON position (indicated in dotted lines in FIG. 17), wherein it is out of engagement with the outer end portion 77b of the alarm reed 77, which is then free to vibrate and produce the audible alarm signal.

When the manual reset alarm delay actuator is manually reset from the outer to the inner alarm silencing position, it engages the toothed ratchet wheel portion 80b on the outer end of the ratchet shaft 80 and this engagement provides the timing for the interval or delay period during which the alarm is silenced. The interval selector shaft 93 or so-called sleep switch is operatively interconnected with the contact member 94 of the appliance control switch and is operable when the main selector control shaft 92 is in the OFF, AUTO or ALARM positions to permit the radio or other appliance controlled thereby to remain on for a selected, adjustable period of time before turning off automatically.

The control shafts 92 and 93 are disposed in parallel relation on opposite sides of the centrally positioned clock shaft 50 and on a common horizontal plane therewith, as best shown in FIG. 1. Both control shafts project forwardly of the front plate 33 of the clock frame and suitable knobs are provided on the outer ends for rotating the shafts to the positions desired.

Referring now, more particularly, to FIGS. 2, 18, 19, 20, and 24, the forward end portion of the main function selector shaft 92 is supported in a circular opening 98 formed in the front wall or flange 83d in the side flange portion 83c of the timer body. The rearward end of the shaft 92 is provided with a reduced diameter shoulder 92a which is supported in an opening 99 formed in a removable switch cover plate 100 which is mounted on the rear surface of the web 83a to cover the switch recess or cavity 96.

As best shown in FIG. 24, the side flange portion 83c of the timer body is formed with an enlarged recess 101 which is in communication with the switch recess 96 in the web or back 83a and with the interior of the right-hand side of the clock 31 between the front and back plates 33 and 34 (FIG. 1). The shaft 92 is centrally supported in and extends longitudinally rearwardly in the large recess 101, and a control member 102 is fixedly mounted on the shaft to rotate freely within the recess. The control member 102 is generally tubular and includes a longitudinal bore 103 therein in order to receive the shaft 92 and, preferably, the control member is formed of molded plastic material. The control member is assembled onto the rear end of the shaft and is advanced forwardly until the bore 103 is firmly seated on a short knurled section 92b (FIG. 24) formed on the shaft intermediate its ends. Accordingly, the control member 102 rotates with the shaft 92 with no relative rotation therebetween.

The body of the control member 102 is formed with a forwardly extending, flexible finger portion 102a of relatively thin construction, and a radially outwardly extending detent finger 102b is formed adjacent the outer end. The detent finger 102b is flexible radially inwardly and outwardly in relation to the longitudinal axis of the shaft 92 and is adapted to snap into and seat in a selected one of a plurality of detent grooves 104a, 104b, and 104c, formed in a shoulder portion 83e projecting rearwardly from the front flange 83d of the timer base flange portion 83c. The grooves or detents 104a, 104b, and 104c are spaced apart and outward radially of the longitudinal axis of main shaft 92, and when the detent finger 102b is seated within a selected groove, the shaft 92 and control member 102 are maintained in a selected rotative position until the shaft is rotated manually.

Referring to FIG. 24, when the detent finger 102b is seated in the first detent groove 104a, the main function selector shaft 92 is in the ALARM position, and when the finger is seated in the second detent groove 104b the selector is in the AUTO position. Further rotation of the shaft 92 seats the detent finger 102b in the third groove 104c, corresponding to the OFF position (FIG. 3), and when the shaft 92 is rotated still further in a clockwise direction (FIG. 24) the detent finger 102b is rotated to the left of the groove 104c into an ON position, wwherein the finger bears against a fourth detent surface 104d, outward of the groove 104c.

Referring to FIG. 1, the control member 102 is therein illustrated in the OFF position with the detent finger 102b seated within the detent groove 104c, and when the shaft 92 is rotated in a counterclockwise direction, the detent finger is moved to the right seating against the surface 104d to manually turn on the radio or other appliance controlled by the switch members 94 and 95. Rotation of the selector shaft 92 in the opposite or clockwise direction from the position shown in FIG. 1, moves the selector into the AUTO position wherein the detent finger 102b is seated in the detent groove 104b, and further rotation is a clockwise direction seats the finger 102b in the first detent groove 104a in the ALARM position.

Referring momentarily to FIG. 24, in order to prevent further clockwise rotation of the shaft 92 from the ON position wherein the detent finger 102b is adjacent the surface 104d on the projection 83e, the timer base includes a projection 83f formed on the back side of the wall or flange 83d of the flange portion 83c above the shaft 92. The projection 83f is spaced above the shaft hole 98 and includes a pair of radially disposed, opposite stop surfaces 105a and 105b. The stop surface 105a is engageable against a radial stop surface 106a formed on the forward end portion of the control member 102, and the opposite stop surface 105b is engageable with a radial stop surface 106b on the control member for preventing further counterclockwise rotation of the control shaft 92 from the ALARM position, wherein the detent finger 102b is seated in the detent grove 104a.

From the foregoing description, it will be seen that the control shaft 92 is rotatable through a limited angular range between four angularly spaced selector positions.

In accordance with the present invention, a switch and alarm delay control actuator 107 is mounted on the shaft 92 rearwardly of the control member 102. The latter control member 107 includes an axial bore 108 and is freely rotatable on the shaft 92 and thus is rotatable relative to the fixed control member 102 thereon.

Figure 14:
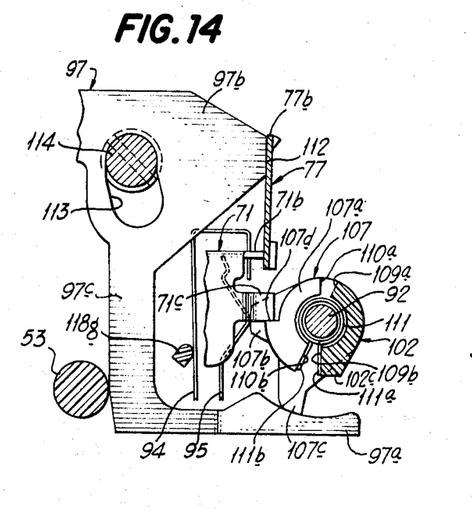
FIG. 14 is a schematic representation of the alarm delay mechanism, control switch, interval selector, main selector, alarm lever, and alarm reed with the main selector in the AUTO position and the alarm lever in a position blocking the alarm reed.
Figure 15:
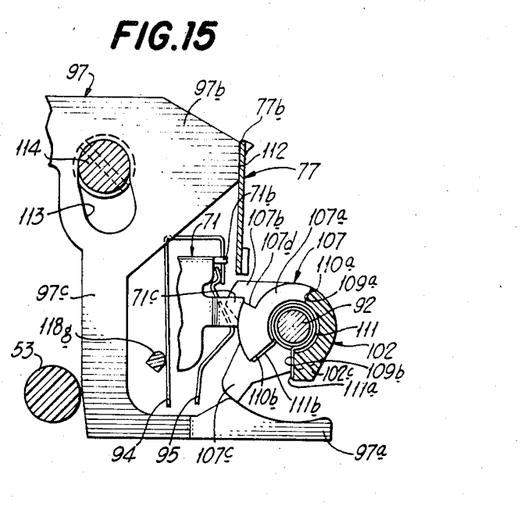
FIG. 15 is a view similar to FIG. 14 showing the components after the alarm lever has moved from the alarm blocking to the alarm ON position.
Figure 17:
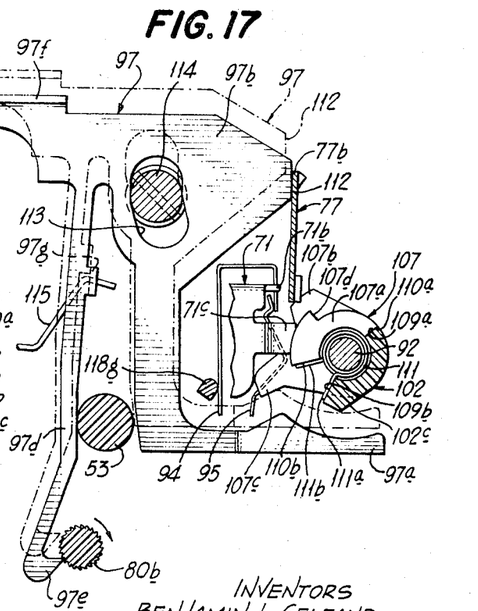
FIG. 17 is a view similar to FIG. 16 showing the components after the alarm lever has moved from the alarm blocking to the alarm ON position, with the alarm delay mechanism shown in solid lines to its reset position and in dotted lines in its alarm ON position.

For the purpose of mechanically interconnecting the control members 102 and 107, and yet permit some relative rotation between the two members, the forward control member 102 includes a rearwardly projecting portion 102c having a pair of rearwardly extending, opposite, radial stop surfaces 109a and 109b thereon. These stop surfaces are adapted to engage respective ones of forwardly extending opposite radial stop surfaces 110a and 110b formed on a forwardly projecting portion 107a of the control member 107. The rearward control member 107 is normally biased relative to the forward control member 102 so that the respective stop surfaces 109a and 110a are in contact with each other, as shown in FIGS. 15 and 17, with the opposing stop surfaces 109b and 110b being angularly spaced from one another, as shown in FIGS. 14, 15 and 17. As viewed in FIGS. 14 through 17, the rearward control member 107 is biased in a clockwise direction relative to the forward control member 102 and for this purpose a coiled biasing spring 111 is mounted on the shaft 92 between the two control members. The spring 111 includes a radially outwardly extending leg 111a at the forward end which bears against the stop surface 109b on the control member 102, and includes a radially outward extending spring leg 111b at the rear end, which bears against the stop surface 110b on the control member 107.

Figures 4, 5:
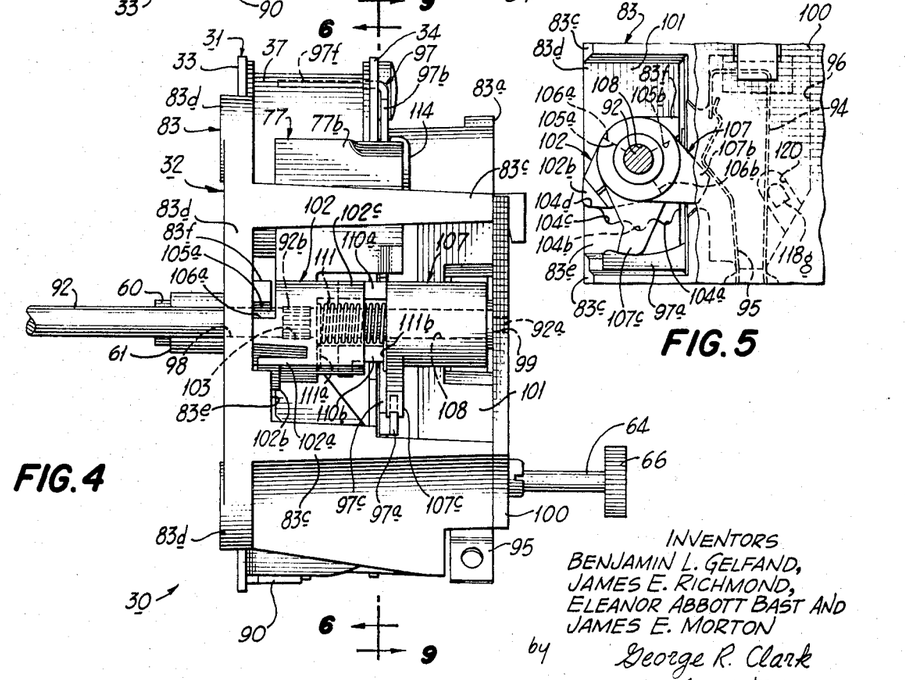
FIG. 4 is a side elevational view looking from the left of FIG. 3.
FIG. 5 is a fragmentary rear elevational view of a small portion of the timer at the left-hand side of FIG. 3 illustrating the main selector control of the timer in its ON position.
Figure 16:
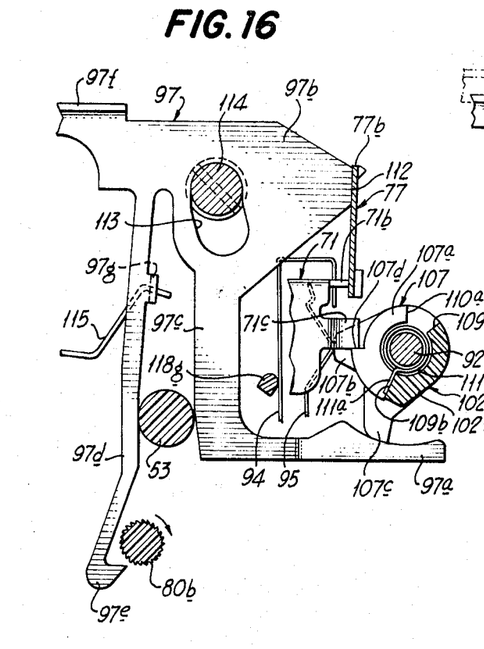
FIG. 16 is a view similar to FIG. 14 with the main selector in the ALARM position and the alarm lever in a position blocking the alarm reed.

In order to actuate the switch member 95, the rear control member 107 is provided with a switch actuating lug 107b formed at the rearward end of the member and extending radially outwardly of the axis of the shaft 92. When the selector shaft 92 is in the OFF position (FIG. 3), the lug 107b engages the switch member 95 urging it toward the switch member 94, thus breaking contact between the switch members. Also, when the selector shaft 92 is positioned in the AUTO position (FIG. 14) or the ALARM position (FIG. 16) and the alarm lever is still in the alarm blocking condition, the switch actuator lug 107b is in contact against the switch member 95 biasing this member inwardly toward the adjacent switch member 94 to break contact therebetween. When the alarm lever 71 snaps out of blocking position against the alarm reed 77, as shown in FIGS. 16 and 17, into the alarm ON position, the spring 111 rotates the rear control member 107 relative to the control member 102 and the lug 107 moves out of engagement with the switch member 95 permitting the switch members to return to the normal or closed position, thereby turning on the radio or other appliance. When the selector shaft 92 is in the ON position, as shown in FIG. 5, the switch lug 107b is out of contact with the switch member 95, and the switch is closed to operate the radio or other appliance manually.

In addition to its function in contacting the switch member 95, the rear control member 107 is also engageable with the alarm delay actuator 97 and for this purpose includes a second radially extending lug or finger 107c spaced forward of the switch lug 107b and angularly disposed thereto. The finger 107c is adapted to engage the curved upper surface on an outwardly extending finger portion 97a of the alarm delay actuator. When the selector shaft 92 is in the ON, OFF, or AUTO position, the lug 107c engages the curved finger 97a and prevents the delay actuator 97 from moving outwardly from the alarm blocking position into the alarm ON position shown in dotted lines (FIG. 17), and accordingly, when the selector shaft 92 is in any of these positions, the alarm reed 77 is not free to vibrate even though the alarm lever 71 has moved out of the blocking position into the alarm ON position.

Referring now to FIG. 16, which shows the selector shaft 92 in the ALARM position, when the alarm lever 71 is in the alarm blocking or alarm OFF position, the lug 107c is bearing against the finger 97a of the alarm delay actuator, and in this position the rearward control member 107 cannot rotate further in a clockwise direction under the influence of the spring 111 because of a third radially extended lug or projection 107d formed thereon which is engaged against a transversely extending short lug or projection 71c formed on the outer end portion of the alarm lever. When the alarm lever snaps out of the alarm blocking position to the alarm ON position, the lug 71c thereon is moved rearwardly of the front plate 33 (FIG. 2) to the position shown in FIG. 8, wherein the lug is out of engagement with the lug 107d on the control member 107. When this occurs, the spring 111 exerts torque on the reraward control member 107 relative to the forward control member 102, causing the former to rotate in a clockwise direction from the position of FIG. 16 to FIG. 17. When this occurs, the lug 107c moves out of engagement with the finger 97a on the manual reset alarm delay actuator 97, and the manual actuator can begin to move outwardly from the alarm blocking position (solid lines, FIG. 17) to the alarm ON position indicated in dotted lines.

Referring momentarily to FIG. 6, the alarm delay actuator 97 is mounted for sliding movement on the back plate 34 of the clock frame and is formed out of non-magnetic sheet metal and stamped or cut out into the shape illustrated. The alarm delay actuator includes an upper main body portion 97b having an outer edge surface 112 which is adapted to bear against the outer end portion 77b of the alarm reed and prevent vibration thereof whenever the alarm delay actuator is in the depressed or inward position. The delay actuator includes a pair of downwardly extending, spaced apart, thin leg portions 97c and 97d, and the outwardly extending finger 97a is joined to or integrally formed with the larger leg 97c. The thinner leg 97d extends downwardly some distance below the finger 97a and terminates in an outer hooked end portion 97e which is adapted to selectively engages the teeth on the ratchet wheel 80b, as will be described hereinafter.

The alarm delay selector is movable vertically on the back plate 34 and is also pivotally movable relative thereto. For this purpose a slot 113 is formed in the main body portion 97b and a cap screw 114 extends through this slot into the core of the clock motor field coil 37, thus forming a pivot point for the actuation, and bearing grommet 53 on the back plate 34 disposed between the legs 97c and 97d guides movement of the lower end portion of the alarm delay selector.

In order to manually actuate or reset the alarm delay mechanism, the upper right-hand end portion of the actuator is formed with a manual actuating tab 97f extending laterally normal to the body portion 97b. The tab is on the top side of the clock mechanism and a suitable actuator button is normally mounted on the clock housing to contact the tab and force the alarm delay selector downwardly into the reset portion when desired. The delay selector is normally biased to the upward position by means of an elongated wire spring 115 having one end fixedly secured within a hole in a grommet member 116 (FIG. 6) attached to the back plate 34 and an outer or free end which projects through an opening formed on a transverse lug 97g formed on the leg 97d. The spring biases the alarm delay actuator upwardly and in a counterclockwise direction about the cap screw mounting pin 114.

As best shown in FIGS. 14, 15, and 16, when the lug 107c of the control member 107 is engaging the curved surface of the finer 97a of the alarm delay actuator, the lower hooked end 97e is held outwardly of and below the ratchet wheel 80b. However, when the selector is in the ALARM position (FIG. 16) and is then released to the position shown in FIG. 17 by movement of the alarm lever lug 71c out of engagement with the lug 107d, the spring 115 causes the alarm delay actuator 97 to move upwardly and toward the ratchet wheel 80b until the pointed end of the hooked portion 97e engages the teeth of the ratchet wheel. The ratchet wheel is continually rotating in a clockwise direction, as indicated by the arrow in FIGS. 16 and 17, and rotates at approximately the same speed as the minute shaft or sleeve 56. At the expiration of a time interval of approximately eight minutes after the first engagement of the tip of the hooked end 97e against the ratchet wheel, the wheel has rotated to the point where the teeth can no longer hold the pointed tip of the hook, and the alarm delay selector 97 is then free to move upwardly to the alarm ON position under the influence of the spring 115. After movement to the upward position, the edge surface 112 of the delay actuator 97 is spaced upwardly and outwardly of the outer end of the alarm reed 77b, and the alarm reed is now free to vibrate and produce an audible alarm signal.

When the alarm sounds, if the user desires to sleep for a few more minutes, the alarm delay actuator 97 can be manually reset for another delay period by pushing downwardly on the tab portion 97f until the lower hooked end 97e again engages the teeth of the ratchet wheel 80b. This action silences the alarm reed 77 until the expiration of another delay period, as described. The alarm delay actuator 97 can thus be reset for several successive delay periods until such time as the alarm lever 71 is returned to the alarm blocking position by the cam lugs 63a becoming disengaged from the slots 68 in the hour gear 59, as previously described. This process takes approximately 45 minutes after initial movement of the alarm lever from the alarm blocking to the ON position, and, upon restoration of the alarm lever to the blocking position, the bulbous end portion 71b again engages the alarm reed 77, preventing the reed from vibrating until twelve hours later.

When the main function control shaft 92 is in the OFF, ON, or AUTO position, the position of the alarm delay selector 97 is maintained in the depressed or alarm blocking configuration by the lug 107c which engages the finger 97a, and the delay actuator 97 thus is only operable when the selector shaft 92 is in the ALARM position and the alarm lever 71 has moved from the alarm blocking position to the alarm ON position.

From the foregoing, it will thus be seen that the radio, television set, or other appliance controlled by the switch members 94 and 95 can be turned on or off manually by movement of the main selector shaft 92 to the ON or OFF position, and when the shaft is set to the AUTO or ALARM position and the alarm lever then moves at the set time from the alarm blocking off position to the alarm ON position, the radio or appliance will automatically be turned on. When the selector shaft 92 is in the AUTO position (FIGS. 16 and 17), in addition to turning on the radio or other appliance at the desired time, the alarm reed 77 will commence to produce an audible signal after the first fixed delay period of approximately eight minutes has expired. During this delay period, the alarm delay actuator slowly moves from the alarm blocking position outwardly to the alarm ON position as the ratchet wheel 80b rotates and the radio or other appliance remains on continuously. The alarm signal, once sounded, can be silenced for consecutive eight-minute delay periods by manual depression of the alarm delay actuator 97 without shutting off the radio.

In accordance with the present invention, the interval selector shaft 93, sometimes called a "SLEEP CONTROL" is journaled for rotation in an integrally formed sleeve or tubular boss portion 83g (FIG. 9) projecting rearwardly from the front flange 83d of the left-hand side flange portion 83b of the timer body 83.

A timer gear 117 is fixedly attached on the rearward end of the control shaft for rotation therewith, and the gear is meshingly engaged with a toothed rack portion 118a formed on one end of an arcuate rim of a sector gear 118, which is mounted for rotation on a pin 83h projecting forwardly from the web or back 83a of the timer body. The sector gear 118 is biased in a counter-clockwise direction (FIG. 9) into the position shown by means of a spring 119 having a coiled body portion mounted on the pin 83h and one leg 119a bearing against a lug or projection 83i formed on the timer body. The other leg 119b of the spring 119 is adapted to engage a lug 118b formed on the arcuate rim of the gear intermediate its ends and the lug is spaced between a pair of spaced apart, generally radially extending spokes 118c and 118d extending outwardly from the hub to the rim. The gear 118 also includes an opposite, outer end portion 118e and a radially spaced outer rim segment is integrally formed at the outer end of the portion 118e. The rim segment is flexible and has a free outer end extending in an opposite direction (FIGS. 9 and 10) toward the rack portion 118a. Preferably, the sector gear 118 is formed of molded plastic material, and the outer rim segment is provided with a rack of fine teeth 118f along the outer surface adapted to selectively engage the teeth on the ratchet wheel 80b.

Figures 9, 10, 11:
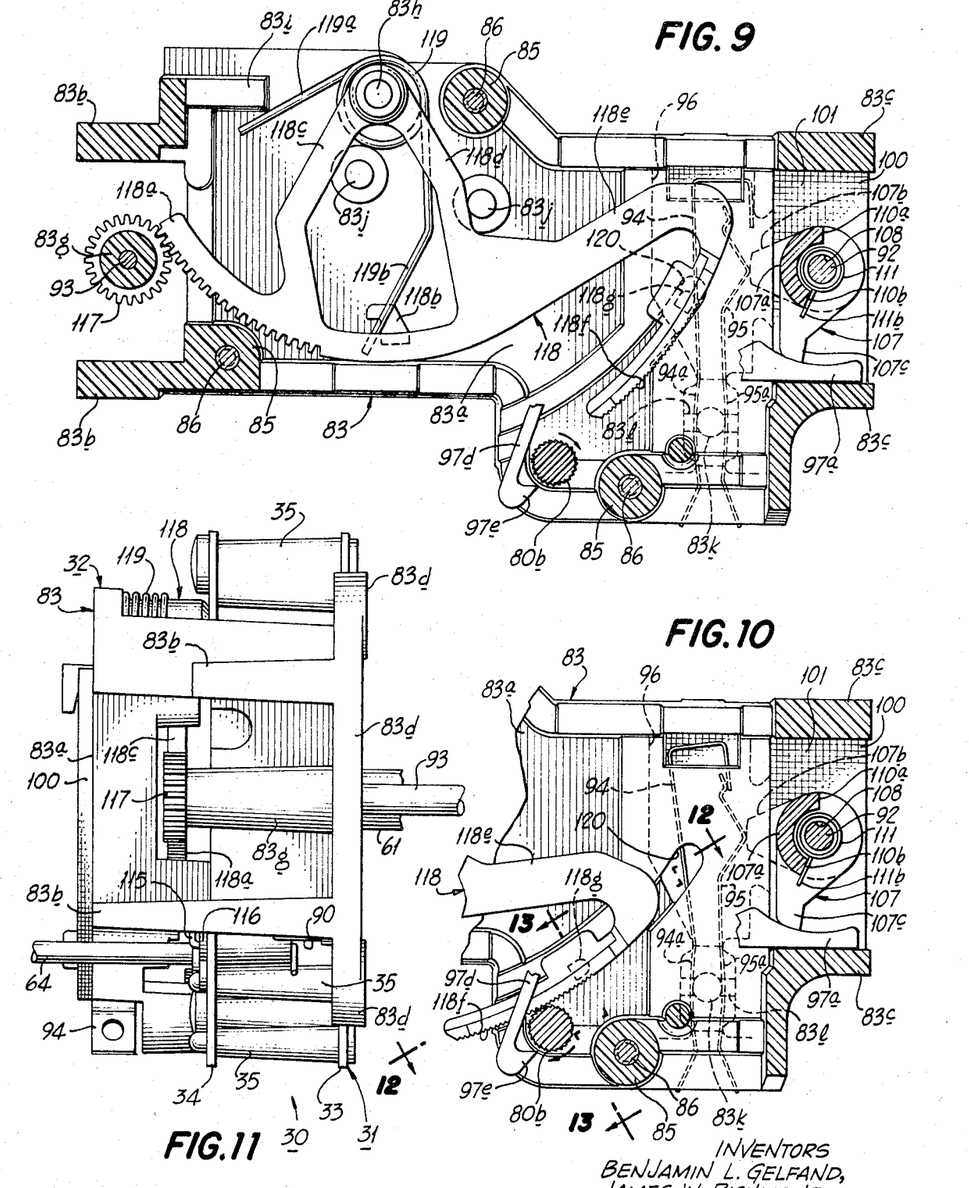
FIG. 9 is a longitudinal cross-sectional view taken substantially along line 9—9 of FIG. 4 illustrating the forward side of a timing control device constructed in accordance with the present invention.
FIG. 10 is a fragmentary view showing a portion of the timer at the right-hand side of FIG. 9 with the time interval selector in an operative position.
FIG. 11 is a side elevational view of the alarm clock timer looking from the left to FIG. 1 thereof.

The sector gear 118 normally occupies the position of FIG. 9, and a stop pin 83j projecting forwardly from the web 83a of the timer body engages the leg 118d to prevent further clockwise travel of the sector gear under the influence of the biasing spring 119. When the interval control shaft 93 is rotated in a counterclockfise direction (FIG. 9) the teeth 118f on the outer rim segment are moved into meshing engagement with the ratchet wheel 80b, and the tip or outer end of the rim segment moves past the ratchet wheel in an amount in direct proportion to the amount of angular rotation of the interval control shaft 93. Because the ratchet wheel teeth are shaped as shown, once the sector gear rack teeth 118f move into meshing engagement with the ratchet wheel, the gear remains in the selected position when the shaft is released. Subsequently, as the ratchet wheel rotates continuously in a clockwise direction, as shown, the sector gear is slowly returned toward its original position, and the time elapsed or required depends upon the amount of rotation imparted to the interval control shaft 93. Because the outer rim segment is relatively thin and flexible, it is easily moved past the ratchet wheel by rotation of the shaft 93, and when the outermost rack tooth 118f finally is released by the ratchet wheel, the sector gear snaps back to its original position because of the spring 119.

In accordance with the invention, the outer rim segment is provided with a rearwardly extending switch actuator lug 118g which is adapted to move in an arcuate slot 120 formed in the web or back 83a of the timer body in communication with the switch recess 96. When the sector gear 118 is in the normal or unset position (FIG. 9), the lug 118g forces the switch member 94 toward the right. When the interval selector shaft 93 is rotated to engage the outer rim segment and teeth 118f with the ratchet wheel 80b, the lug 118g moves outwardly away from the switch member 94 which is then free to deflect leftward to a normal or switch closing position (FIG. 10), making contact with the switch member 95. After a selected interval or period of time has expired and the outer tooth 118f on the rim segment moves out of contact with the ratchet wheel 80b, the spring 119 rotates the sector gear in a counterclockwise direction, and the lug 118g moves inwardly against the switch member 94, causing it to move from the switch ON position of FIG. 10 toward the switch OFF position of FIG. 9. This arrangement provides the so-called "SLEEP SWITCH" function for the clock timer.

When the main control shaft 92 is set to the OFF, AUTO or ALARM positions, as described, and the switch actuator lug 107b is biasing the switch member 95 inwardly breaking contact between the switch members 94 and 95, if the interval control shaft 93 or sleep switch is then rotated to drive the sector gear 118 in a clockwise direction out of the normal position of FIG. 9 to a selected time interval position, as indicated in FIG. 10, the lug 118g is then moved out of engagement with the switch member 94, permitting the switch contact members 94 and 95 to close contact even though the switch actuator lug 107b remains in the switch OFF position. This action turns the radio or other appliance on until the time interval which has been selected by the amount of rotation of the interval control shaft 93 has elapsed, at which time the lug 118g snaps back against the switch member 94 causing the switch to open and automatically shut off the appliance. The user can thus turn the main selector shaft 92 to the OFF, AUTO or ALARM position and then set the interval control shaft 93 for a desired period of time turning on the radio or TV set controlled by the timer, and, after expiration of the selected time interval, the appliance will be shut off automatically. The gear 117 is of a suitable diameter so that approximately 180° of rotation of the shaft 93 will move the sector gear 118 from the STOP position of FIG. 9 to the maximum time interval setting, wherein all of the teeth 118f on the outer rim segment must pass in engagement with the rotating ratchet wheel 80b. The maximum time interval is normally approximately 60 minutes in the usual configuration so that a user may set the sleep switch by use of the interval selector shaft for a selectively adjustable period varying from zero to sixty minutes, depending upon the amount of shaft rotation.

The switch members 94 and 95 are provided with short base portions 94a and 95a, respectively, intermediate their ends, and the lower end of the switch members are adapted to be soldered to lead wires running to the power supply of the appliance, such as a radio or television set which is to be controlled. The intermediate base portions of the respective switch members are provided with slots 124 and 125, respectively (FIG. 24), which are adapted to seat on a rib portion 83l which is formed in the lower portion of the switch recess 96 on the back or web 83a of the timer body. The rib 83l (FIG. 24) extends transversely of a rearwardly extended integral mounting pin or projection 83k against which the adjacent facing surfaces of the base portions 94a and 95a of the switch members are seated. In a normal position, the upper end portions of the switch members are deflected or biased outwardly away from each other so that the switch is a normally closed switch. When the switch lug 107b engages with the switch member 95, biasing it toward the switch member 94, contact is broken, provided that the switch member 94 is maintained in its normal position by the lug 118g on the sector gear 118. However, if the sector gear 118 is moved out of its normal or unset position, the lug 118 is moved away from the switch member 94, permitting it to deflect outwardly and close the switch regardless of the fact that the main selector shaft 92 is in the OFF position.

From the foregoing, it will be seen that the timer 32 is especially adaptable for use in combination with a clock 31 of the Jepson et al. type with only minor modifications therein, and the timer clock combination provides an extremely useful arrangement which is operable to turn a radio or other controlled appliance on or off manually, or when in the AUTO position is operable to automatically turn the appliance on at a future time set by the alarm setting feature of the clock. When the selector is in the ALARM position, the clock or appliance will come on automatically at the set time and, in addition, the alarm buzzer will sound some eight minutes later. The alarm can be manually silenced and set for successive delay periods as desired. The device is relatively simple in operation, yet provides many desirable control features and can be mass produced economically.

Figure 21:
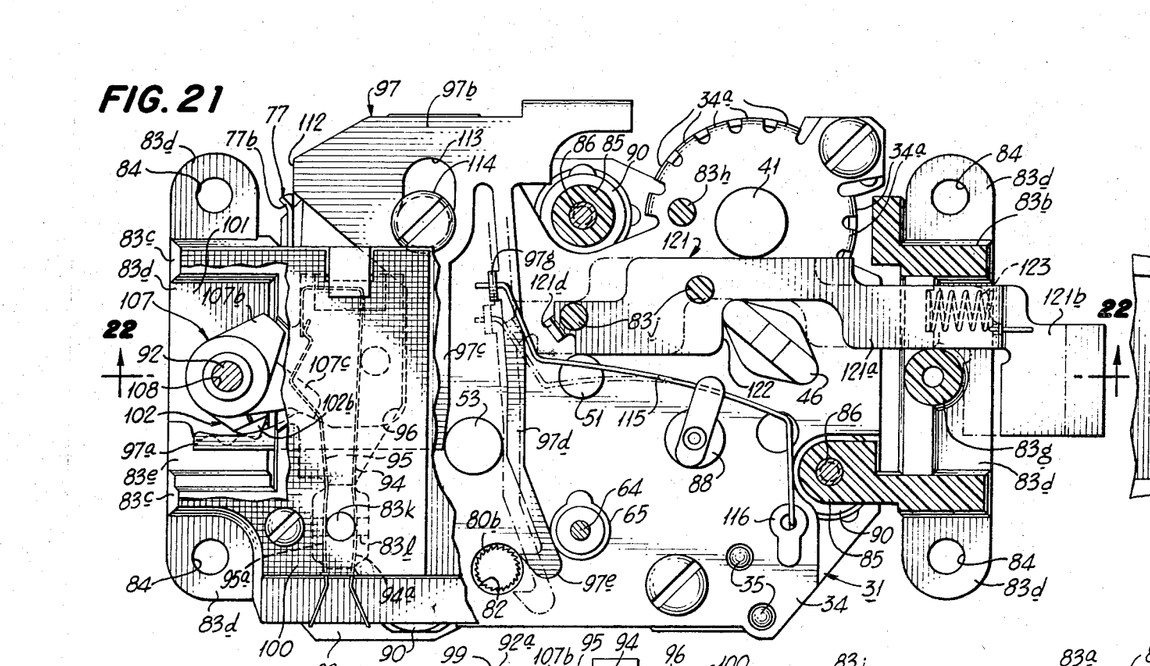
FIG. 21 is a longitudinal sectional view similar to FIG. 6 but illustrating another embodiment of the present invention employing an alarm delay mechanism resettable from one side of the alarm clock timer.
Figure 22:
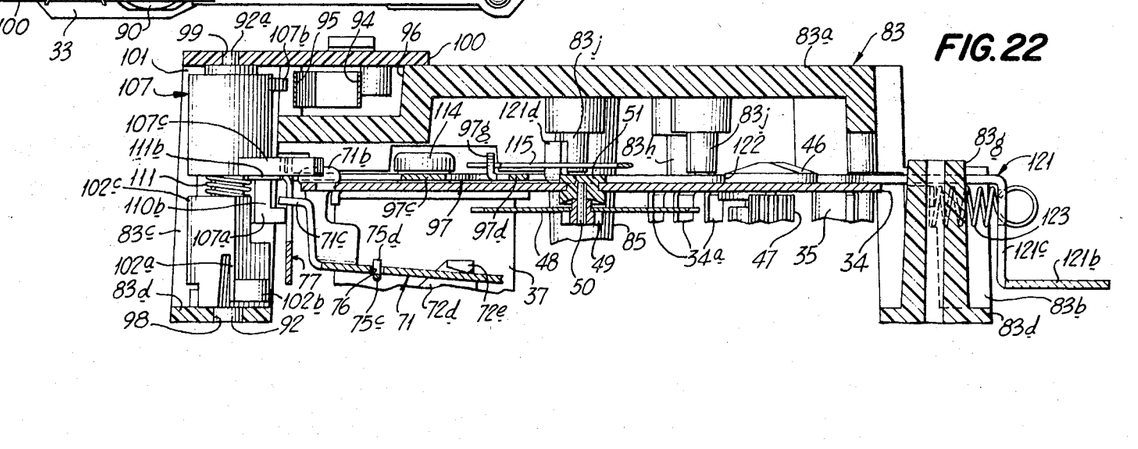
FIG. 22 is a cross-sectional view taken substantially along line 22—22 of FIG. 21.
Figure 23:
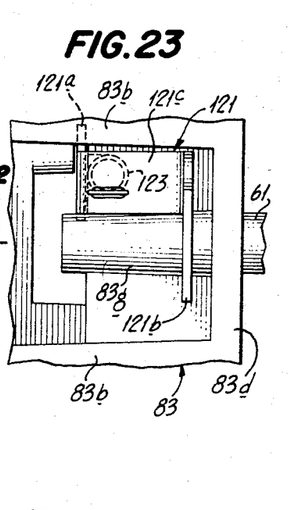
FIG. 23 is a fragmentary side elevational view of the alarm clock timer of FIG. 21 viewed from the right side.

Referring now to FIGS. 21 through 23, therein is illustrated a modified embodiment of the invention which is similar in construction and operation to the clock timer combination previously described, with the exception that an additional means is provided for manually actuating the alarm delay actuator 97 thereof. In order to permit manual depressing of the alarm delay actuator from the side of the clock, rather than the top as in the previous embodiment, there is provided an elongated plunger 121 which is mounted for lateral sliding movement on the back plate 34 of the clock frame. The plunger 121 includes a main body portion 121a having a slotted out portion 122 along one side which receives the guiding bearing grommet 46, and on the opposite side of the body portion the plunger is engaged against the bearing grommet 41 which supports the rotor shaft. The outer end portion of the plunger 121 extends outwardly from the right-hand side of the clock timer combination (FIG. 21) and includes a transversely offset bracket or tab portion 121b which is adapted to project through an opening in the wall of a housing or cabinet in which the clock timer is mounted. The plunger is normally biased toward an outer position by a compression spring 123 having one end disposed against a wall of the side flange portion 83b of the timer body, and the opposite end of the spring is seated within a slot provided in an offset leg 121c adjacent the outer tab 121b. The inner end of the plunger 121 includes a small upstanding lug 121d which is adapted to move against one side of the elongated leg portion 97d of the alarm delay actuator 97. When the outer end tab portion 121b of the actuator is forced inwardly against the force of the spring 123, the lug 121d engages the leg 97d and moves the actuator downwardly to the position shown in dotted lines wherein the edge portion 112 engages the outer end portion 77b of the alarm reed to prevent vibration thereof. This movement also causes the tip of the hooked end 97e of the delay actuator to move into contact with the rotating rachet wheel 80b so that the fixed alarm delay period will be commenced. After elapse of the alarm delay period, as previously described, the spring 115 returns the actuator 97 to the upper or alarm ON position, wherein the edge 112 is spaced away from the outer end portion 77b of the reed 77. The plunger 121 can then be actuated to reset the delay member 97 as desired for successive delay periods.

The alarm clock timer, as described herein, thus provides a new and improved, greatly simplified mechanism for providing a full feature control timer to be used in controlling an external appliance, such as a radio or television set. The timing device 32 is adaptable for use with a clock motor and movement of the type described in the Jepson et al. patent, and the alarm clock timer combination as illustrated and described herein, provides many new and unique features.

While there have been shown and described two embodiments of the present invention, it will be apparent to those skilled in the art that various changes and modifications may be made without departing from the invention in its broader aspects, and it is therefore contemplated in the appended claims to cover all such changes and modifications as fall within the true spirit and scope of the invention.

What is claimed as new and desired to be secured by Letters Patent of the United States is:

1. In a clock timer including a magnetic frame and clockworks mounted on said frame, an alarm member supported from said frame and movable toward and away from a portion thereof in response to magnetic fluctuations therein, an alarm lever supported for pivotal movement relative to said frame and movable at a selected time from a normal, alarm blocking position engaging said alarm member to an alarm on position away from said alarm member permitting vibration thereof, a ratchet wheel driven continuously in one direction by said works, manual alarm delay means mounted on said frame for movement between a first alarm blocking position engaging said alarm member and a second alarm on position out of blocking engagement permitting vibration of said alarm member, said delay means being detainably engageable with said ratchet wheel upon travel toward said second position from said first position and for a timed interval and released from engagement upon a selected amount of rotation of said ratchet following initial engagement, and function selector means movable between a plurality of settings, said selector means including retainer means operable in at least one of said settings for maintaining said delay means in said first position out of engagement with said ratchet wheel.

2. The clock timer of claim 1 wherein said delay means includes an elongated leg having hook means thereon for detaining engagement with the teeth of said ratchet wheel when said delay means moves from said first position toward said second position.

3. The clock timer of claim 2 including plunger means manually actuable to engage said leg for moving said delay means into said first position.

4. The clock timer of claim 1 wherein said retainer means is shiftable when said selector means is in said one setting to a position out of engagement with said delay means upon movement of said alarm lever at said selected time from said normal position to said alarm ON position.

5. The clock timer of claim 1 wherein said delay means is manually movable from said second to said first position and including means for biasing said delay means from said first to said second position.

6. The clock timer of claim 5 including function selector means movable between a first position maintaining said delay means in said first position and a second position releasing said delay means for movement toward said second position.

7. The clock timer of claim 6 wherein said alarm lever is engageable with said function selector to maintain the latter in said first position when said level is in said alarm blocking position and is movable to release said function selector for movement to said second position at said selected time.

8. In a clock time including a frame and clockworks mounted thereon, switch means for controlling an appliance including a pair of contact members, first selector means movable between an OFF and an ON position into and out of engagement with one of said contact members, a ratchet wheel continuously driven by said works, and second interval selector means normally engaging the other of said contact members in a first position and movable out of engagement therewith into engagement with said ratchet wheel in a second position, said second selector means biased for return from said second to said first position upon rotation of said ratchet wheel during a selectively adjustable timed interval commencing with initial engagement of said second selector means with said ratchet wheel, said switch means operable to turn said appliance on when said first selector means is out of said ON position and said second selector means is in said second position.

9. The clock timer of claim 8 wherein said switch means is normally closed and is opened when said first selector is moved from said ON to said OFF position.

10. The clock timer of claim 9 wherein movement of said second selector from said first to said second position when said first selector is in said OFF position is operable to change said switch from an open to a closed condition.

11. The clock timer of claim 8 wherein said second selector means comprises a rotatable sector gear structure biased toward said first position and includes an arcuate, toothed rack portion movable into detaining engagement with said ratchet wheel on movement from said first to said second position, rotation of said ratchet wheel against said rack portion permitting the timed return of said second selector to said first position.

12. The clock timer of claim 11 wherein said rack portion includes a free outer end deflectable radially inward toward the axis of rotation of said sector gear upon detaining engagement with said ratchet wheel.

13. The clock timer of claim 12 wherein the time interval for return of said sector gear from said second to said first position is adjustably dependent on the amount of rotation of said sector gear away from said first position past the point of initial engagement of said rack portion and said ratchet wheel.

14. The clock timer of claim 13 wherein said second selector means is movable out of engagement with said switch means upon rotation of said sector gear toward said second position before engagement is made between said rack portion and said ratchet wheel.

15. In a clock timer including a frame and clockworks mounted thereon, a vibrating alarm member, an alarm lever pivotal on said frame and movable at a selected time from a normal, alarm blocking, OFF position to an alarm ON position away from said alarm member, switch means for controlling an appliance including a pair of contact members, first selector means movable between positions and out of engagement with one of said contact members, a ratchet wheel driven by said works, means interconnecting said first selector means and said alarm lever for moving the former into position out of engagement with said switch means when the latter moves to said alarm ON position, and second internal selector means normally engaging the other of said contact members in a first position and manually movable out of engagement with said other contact member into selected detainable engagement with said ratchet wheel in a second position, said second means biased for return from said second to said first position upon rotation of said ratchet wheel during a selected interval of time commencing with initial engagement of said second selector means with said ratchet wheel.

16. The clock timer of claim 15 wherein switch means is operable to turn said appliance on upon movement of said interconnecting means out of engagement therewith.

17. The clock timer of claim 16 wherein said first selector means is movable to an OFF position and includes stop means for preventing movement of said interconnecting means out of engagement with said contact means when said alarm lever moves to said alarm ON position at said selected time.

18. The clock timer of claim 17 including alarm delay means movable between an alarm silencing position and an alarm ON position away from said alarm member, said first selector means including control means for maintaining said delay means in said alarm silencing position when said selector means is in said OFF position.

19. The clock timer of claim 18 wherein said first selector is movable to an ON position out of engagement with said contact member and wherein said control means maintains said delay means in said alarm silencing position.

20. In a clock timer including a frame and clockworks mounted on said frame, a vibrating alarm member, an alarm lever pivotal on said frame and movable at a selected time from a normal alarm blocking, OFF position to an alarm ON position away from said alarm member, a ratchet wheel driven by said works, manual alarm delay means mounted on said frame for movement between an alarm blocking position and an alarm ON position out of blocking engagement with said alarm member, said delay means engageable with said ratchet wheel upon travel between said blocking position and said alarm ON position and releasably detained by said ratchet for timed movement toward said alarm ON position upon rotation of said ratchet wheel during a time delay period commencing with initial engagement between said delay means and said ratchet wheel, and function selector means movable between a plurality of different positions, said function selector means including stop means engaging said delay means when said alarm selector means is in one or more of its selected positions for preventing movement of said delay means from said alarm blocking position to said ALARM position when said alarm lever moves to said alarm ON position at said selected time.

21. The clock timer of claim 20 including switch means for controlling an appliance and including a pair of contact members normally closed to turn the appliance on, said function selector including control means engaging one of said contact members for closing and opening said switch means in response to movement of said function selector between ON and OFF positions.

22. The clock timer of claim 21 wherein said function selector is movable between AUTO and ALARM positions wherein said control means normally engages said contact member to open said switch means while said alarm member is in said alarm blocking off position and wherein said control means is operable to permit closing of said switch means while said selector is in said AUTO and ALARM position upon movement of said alarm lever from said alarm blocking, OFF position to said alarm ON position.

23. The clock timer of claim 22 wherein said stop means is shiftable out of engagement with said alarm delay means when said function selector means is in said ALARM position and said alarm lever moves from said alarm blocking, OFF position to said alarm ON position.

References Cited

UNITED STATES PATENTS

| | | | |
|---|---|---|---|
| 2,996,874 | 8/1961 | Chartier et al. | 58—21.155 |
| 3,109,280 | 11/1963 | Ring et al. | 58—21.155 |
| 3,200,577 | 8/1965 | Ring et al. | 58—21.155 |
| 3,220,175 | 11/1965 | Richmond | 58—21.155 |

RICHARD B. WILKINSON, Primary Examiner

J. F. GONZALES, Assistant Examiner

U.S. Cl. X.R.

58—21.155